«12» United States Patent
Xu et al.

(10) Patent No.: US 10,844,218 B2
(45) Date of Patent: Nov. 24, 2020

(54) SINGLE-COMPONENT MOISTURE CURABLE SILANE SEALANT PLASTICIZED WITH HYDROLYSABLE POLYETHER MONOSILANES

(71) Applicant: Dow Global Technologies LLC, Midland, MI (US)

(72) Inventors: Qiuyun Xu, Pearland, TX (US); Amber Stephenson, Lake Jackson, TX (US); William H. Heath, Lake Jackson, TX (US); William A. Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 84 days.

(21) Appl. No.: 15/767,276

(22) PCT Filed: Oct. 12, 2016

(86) PCT No.: PCT/US2016/056658
§ 371 (c)(1),
(2) Date: Apr. 10, 2018

(87) PCT Pub. No.: WO2017/087097
PCT Pub. Date: May 26, 2017

(65) Prior Publication Data
US 2019/0062551 A1  Feb. 28, 2019

Related U.S. Application Data

(60) Provisional application No. 62/257,216, filed on Nov. 18, 2015.

(51) Int. Cl.
*C08G 77/00* (2006.01)
*C08G 59/00* (2006.01)
*C08G 65/06* (2006.01)
*C08K 5/57* (2006.01)
*C08L 71/02* (2006.01)
*C08K 5/057* (2006.01)
*C08G 65/336* (2006.01)

(52) U.S. Cl.
CPC ............ *C08L 71/02* (2013.01); *C08G 65/336* (2013.01); *C08K 5/057* (2013.01); *C08K 5/57* (2013.01); *C08L 2205/025* (2013.01); *C08L 2205/03* (2013.01)

(58) Field of Classification Search
CPC ......... C08G 77/00; C08G 59/00; C08G 65/06
See application file for complete search history.

(56) References Cited

U.S. PATENT DOCUMENTS

| 4,824,888 A | 4/1989 | Emmerling et al. |
| 5,525,654 A | 6/1996 | Podola |
| 6,218,462 B1 | 4/2001 | Pantone |
| 2013/0108876 A1 | 5/2013 | Komori |
| 2016/0160103 A1 | 6/2016 | Volker |

FOREIGN PATENT DOCUMENTS

| DE | 102013216852 A | 2/2015 |
| WO | 2013/057429 A | 4/2013 |

*Primary Examiner* — Caixia Lu

(57) ABSTRACT

Moisture-curable resin compositions include a mixture of one or more polysilylated of ethers and one or more polyether monosilanes. The polyether monosilanes have one hydrolysable silane group per molecule, and the hydrolysable silane group has at least two hydrolysable substituents. The polyether monosilane is an effective plasticizer and viscosity reducer. Despite the presence of the polyether monosilane, the resins compositions cure to form cured sealants having useful tensile and elongation properties.

14 Claims, No Drawings

SINGLE-COMPONENT MOISTURE CURABLE SILANE SEALANT PLASTICIZED WITH HYDROLYSABLE POLYETHER MONOSILANES

This invention relates to moisture curable sealants that contain hydrolysable polysilylated compounds.

Compounds that contain hydrolysable silane groups can engage in a condensation reaction whereby the silane groups react with water to form silanol functional groups, which can further condense with each other to produce siloxane (Si—O—Si) linkages. Because this reaction can proceed at room temperature, with atmospheric moisture as a water source, this reaction is a useful polymer curing mechanism. A class of sealant materials has been created that takes advantage of this curing mechanism. The sealants include one or more liquid reactive components that have two or more hydrolysable silane groups. When cured, these sealants form elastomeric polymers.

The job of the cured sealant is to close small gaps through which fluids such as water or air could otherwise penetrate. Once applied, the sealant normally remains in place for an extended period of time, and must maintain the seal over its lifetime. During this time, the width of the sealed gap can vary quite significantly due to thermal expansion and contraction, vibrational forces, settling, and other small movements of the materials.

To accommodate this movement, the cured sealant should have high elongation and low tensile strength. Elongation is wanted so the sealant does not crack or separate from the substrates as they move over time. Low tensile strength is desirable so the movement of the substrates is not unduly restrained. Sealants are commonly formulated with plasticizers to increase their elongation and/or decrease tensile strength. Plasticizers also tend to reduce the viscosity of the uncured sealant.

Plasticizers are in general solvents for the silylated components. Plasticizers are characterized by having high boiling temperatures, high flash points and low vapor pressure. Commonly used plasticizers include phthalate and/or terephthalate esters, various sulfonate compounds, epoxidized vegetable oils, fatty acid esters, trimellitate esters, phosphate esters, and other carboxylic acid esters.

Over time, these plasticizers can separate from the cured sealant. The loss of plasticizer affects the properties of the cured sealant, leading to, among other things, a loss of the desired elongation. Shrinkage and embrittlement also can result as plasticizer is lost. These phenomena promote sealant failure. The lost plasticizer often escapes into the air, creating an odor and creating a problem of exposure to humans and animals. The plasticizer may re-deposit onto other surfaces, fogging windows and creating other contamination issues.

Because of these problems with conventional plasticizers, it is desirable to provide an alternative way to plasticize a moisture-curable silane sealant.

This invention is in one aspect a moisture-curable resin composition comprising a) at least one liquid polysilane compound having a number average molecular weight of at least 1000 and at least two hydrolysable silane groups per molecule; and b) from 20 to 95 mole percent, based on the total number of moles of components a) and b), of at least one liquid polyether monosilane compound having a polyether segment having a segment weight of at least 200 daltons and exactly one di- or trifunctional hydrolysable silane group per molecule.

The invention is also a sealant composition comprising the resin composition of the first aspect and c) at least one silanol catalyst.

The polyether monosilane compound functions as a very effective reactive plasticizer. Its silane group engages in the silanol curing reaction and the monosilane compound thus becomes incorporated into the polymer network that forms when the resin composition cures. Therefore, the problems of fugitive plasticizers are avoided.

Component a) of the resin composition is one or more liquid (at room temperature) polysilane compounds. These polysilane compounds have a number average molecular weight of at least 1000, and at least two hydrolysable silane groups per molecule. The number average molecular weight may be, for example, at least 2000, at least 4000, at least 8000, or at least 10,000, and may be up to 30,000, up to 20,000 or up to 15,000. The polysilane compound(s) may have 6 or more hydrolysable silane groups per molecule, but preferably have 2 to 4, especially 2 or 3, such groups.

A hydrolysable silane group is a group containing a silicon atom and at least one hydrolysable substituent bonded to the silicon atom. The hydrolysable silane group of the polysilane compound(s) (component a)) may contain 1, 2 or 3 hydrolysable substituents. The silicon atom is bonded to the remainder of the compound through a non-hydrolysable linkage.

A hydrolysable substituent is one that reacts with water to eliminate the substituent and produce an Si—OH moiety, which can further react to form an Si—O—Si— linkage. Hydrolysable substituents include halogen, particularly chlorine; alkoxy groups, particularly $C_{1-6}$ alkoxyl and especially methoxy and ethoxy; phenoxy or ring-substituted phenoxy groups, acyloxy groups such as acetoxy; trialkyl siloxy groups, which may be substituted on one or more of the alkyl groups, such as trimethyl siloxy and triethyl siloxy; triphenyl siloxy, which may be substituted on one or more of the phenyl rings; alkenyloxy groups such as isopropenyloxy; and ketoximato groups such as dimethylketoximato, diethylketoximato, dicyclohexylketoximato, and methylethylketoximato.

Examples of hydrolysable silane groups include trichlorosilyl, methyldichlorosilyl, dimethylchlorosilyl, phenyldichlorosilyl, (trimethylsiloxy)dimethylsilyl, trimethoxysilyl, triethoxysilane, methyldiethoxysilyl, methyldimethoxysilyl, dimethylmethoxysilyl, diethylmethoxysilyl, phenyldimethoxysilyl, trimethylsiloxymethylmethoxylsilyl, trimethylsiloxydiethoxysilyl, methyldiacetoxysilyl, phenydiaectoxysilyl, triacetoxysilyl, trimethylsiloxymethylacetoxysilyl, trimethylsiloxydiacetoxysilyl, bis(dimethylketoximato)methylsilyl, bis(cyclohexylketoximato)methylsilyl, bis(diethylketoximato)trimethylsiloxysilyl, bis(methylethylketoximato)methylsilyl, tris(acetoximato)silyl, and methylisopropyenyloxysilyl.

The number of hydrolysable substituents that a hydrolysable silyl group contains is sometimes referred to herein as its "functionality", i.e., a silyl group having only one hydrolysable substituent is "monofunctional", one have exactly two hydrolysable substituents is "difunctional", and one having three hydrolysable substituents is "trifunctional". The "functionality" of a compound such as components a) and b) is equal to the total number of hydrolysable substituents attached to silicone atoms. In the mixture of components a) and b), the average functionality is equal to the average number of hydrolysable silane groups per molecule, multiplied by the average number of hydrolysable substituents per hydrolysable silane group.

The polysilane compound(s) of component a) may contain one or more elastomeric segments such as, for example, a poly(ether) segment, a diene rubber segment, and the like. Such elastomeric segment(s) may have a segment weight of, for example, 800 to 20,000 daltons, i.e., the weight of such segments in a mole of a component a) polysilane compound is 800 to 20,000 g/mol. The polysilane compound(s) of component a) may contain urethane and/or urea groups.

Examples of the component a) polysilane compounds include:

Type 1): Polyethers terminated with hydrolysable silane groups and which contain neither urethane nor urea groups, such as are described, for example, in U.S. Pat. No. 6,664,323. These can be prepared by reaction of a polyether having two or more terminal carbon-carbon double bonds with a silyl hydride having at least one hydrolysable substituent.

Type 2): Urethane and/or urea group-containing, hydrolysable silane-terminated polyethers such as are described, for example, in U.S. Pat. No. 8,232,362 and US Published Patent Application No. 2013-0245194. These can be prepared, for example, in a reaction of an isocyanate-terminated polyether that has two or more isocyanate groups with an aminoalkylsilane that contains hydrolysable substituents.

Type 3): Urethane group-containing polysilylated polyethers that are free of urea groups, such as are described, for example, in WO 2012/003187, WO 2012/003216 and U.S. Pat. No. 8,877,885. These polysilylated polyethers are made in a process that starts with a polyether monol having terminal ethylenic unsaturation. The monol is hydrosilylated by reaction of the ethylenic group with a silyl hydride that has one or more hydrolysable substituents. The resulting hydrosilylated polyether monol is coupled in one step by reaction with a polyisocyanate (preferably a diisocyanate), or in two steps by capping the alcohol group with a polyisocyanate (again preferably a diisocyanate) and then coupling the resulting isocyanate-capped monosilylated polyether with a polyol.

In making the Type 3) polysilane compounds, the polyether monol having terminal ethylenic unsaturation is conveniently formed by adding one or more alkylene oxides to an ethylenically unsaturated alcohol such as, for example, vinyl alcohol, allyl alcohol, methallyl alcohol, trimethylolpropane monoallyl ether, trimethylolpropane diallyl ether, glycerol monoallyl ether, glycerol diallyl ether, hydroxyethyl acrylate, hydroxyethyl methacrylate or a hydroxyl-terminated polybutadiene. The alkylene oxide is preferably ethylene oxide, 1,2-propylene oxide, 1,2-butylene oxide or a mixture of any two or more thereof. The polyether monol most preferably is a polymer of 1,2-propylene oxide or a random and/or block copolymer of a mixture of 50-99.5 weight-% (preferably 70-99.5 weight-%) 1,2-propylene oxide and 0.5-50 weight-% (preferably 0.5 to 30 weight-%) ethylene oxide.

In making the Type 3) polysilane compounds, the silyl hydride may be a dialkoxysilyl hydride or trialkoxysilyl hydride compound that may have the structures

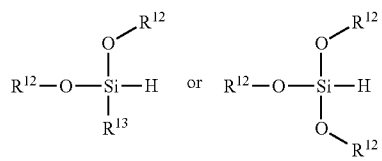

wherein each $R^{12}$ is alkyl, and each $R^{13}$ is a non-hydrolysable group. Each $R^{12}$ may be, for example, methyl, ethyl, isopropyl, n-propyl, sec-butyl, t-butyl or n-butyl. Each $R^{13}$ may be, for example, $C_1$-$C_{12}$ alkyl, phenyl, alkyl-substituted phenyl, or trialkylsiloxymethyl. $R^{12}$ is preferably methyl, ethyl or trimethylsiloxyl. Examples of suitable dialkoxysilyl hydride or trialkoxylsilyl hydride compounds include trimethoxysilane, triethoxysilane, methyldiethoxysilane, methyldimethoxysilane, phenyldimethoxysilane, trimethylsiloxymethyldimethoxysilane, trimethylsiloxymethyldiethoxysilane and methyldisopropyloxysilane. Among these, methyldimethoxysilane, trimethoxysilane, methyldiethoxysilane and triethoxysilane are preferred on the basis of favorable reactivity and ease of handling.

In making the Type 3) polysilane compounds, the polyisocyanate used to cap or couple the monosilylated polyether monol may be aliphatic or aromatic. The polyisocyanate is preferably a diisocyanate, although polyisocyanate compounds having higher isocyanate functionalities can be used. Examples of useful aromatic polyisocyanates include toluene diisocyanate, diphenylmethane diisocyanate, 4,4'-biphenylene diisocyanate, methoxyphenyl-2,4-diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, naphthylene-1,5-diisocyanate, and m-phenylene diisocyanate. Examples of aliphatic polyisocyanates include hexamethylene-1,6-diisocyanate, tetramethylene-1,4-diisocyanate, cyclohexane-1,4-diisocyanate, hexahydrotoluene diisocyanate, and isophorone diisocyanate.

When the Type 3) polysilane compound is formed by coupling an isocyanate-capped monosilylated polyether monol by reaction with a polyol, the polyol used in such a coupling reaction may have, for example, 2 to 6, preferably 3 to 6 or 3 to 4, hydroxyl groups per molecule. The hydroxyl equivalent weight may be, for example, 25 to 10,000. A preferred polyol is a polyether polyol that nominally has 2 to 6, preferably 3 to 6 or 3 or 4, hydroxyl groups per molecule and a hydroxyl equivalent weight of 500 to 2500. The "nominal" number of hydroxyl groups of a polyether polyol refers to the number of oxyalkylatable sites on the initiator compound(s) used to make the polyether polyol. The hydroxyl equivalent weight of the polyether polyol may be, for example, 800 to 2500, 1000 to 2200 or 1300 to 1800. The polyether polyol in some embodiments is a polymer of 1,2-propylene oxide or random and/or block copolymer of a mixture of 50-99.5 weight-% (preferably 70-99.5 weight-%) 1,2-propylene oxide and correspondingly 0.5-50 weight-% (preferably 0.5 to 30 weight-%) ethylene oxide.

A Type 3) polysilane compound may be represented by the structure (I):

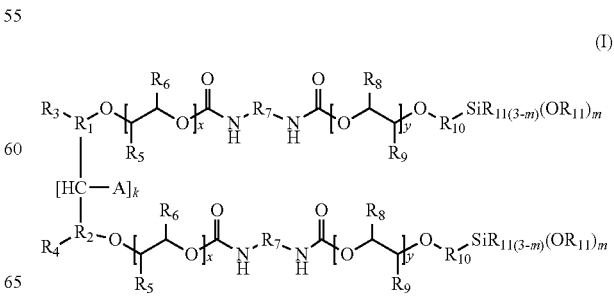

where A is either H or has the structure (II):

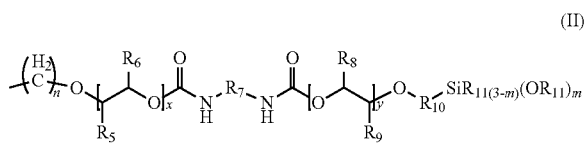
(II)

k is a number from 0 to 4, m and n are independently numbers from 0 to 3, the values of x and y are such that the compound has a molecular weight as described above, $R_1$, $R_2$, $R_{10}$ and $R_{11}$ are independently straight chain or branched alkyl groups having 1 to 4 carbon atoms, $R_3$, $R_4$, $R_5$, $R_6$, $R_8$ and $R_9$ are independently hydrogen or straight chain or branched alkyl groups having 1 to 4 carbon atoms, and $R_7$ is aliphatic, cycloaliphatic, bis-benzylic and/or aromatic and has 2 to 20 carbon atoms.

Component b) of the resin composition is at least one liquid polyether monosilane compound having a polyether segment having a number average segment weight of at least 200 i.e., the weight of such segments in a mole of a component a) polysilane compound is at least 200 g/mol. It has only one di- or trifunctional hydrolysable silane group per molecule. A difunctional hydrolysable silane group has exactly two hydrolysable substituents bonded to the silicon atom. A trifunctional hydrolysable silane group has three hydrolysable substituents bonded to the silicon atom. The hydrolysable substituents may be of any of the types described above, but preferably are alkoxy or phenoxy. The hydrolysable silane group preferably is terminal, i.e., located at an end of the molecule. The polyether monosilane compound preferably is devoid of other functional groups that can participate in the cure of the resin composition. The polyether monosilane compound may contain one or more heteroatom-containing groups, such as hydroxyl groups, which do not participate or interfere with in the curing reaction(s).

The polyether segment may have a segment weight of up to 20,000 daltons, preferably up to 8,000 daltons, i.e., the weight of such segments in a mole of a component b) polyether monosilane compound is up to 20,000 g/mol, preferably up to 8,000 g/mol. A preferred weight for the polyether segment is 500 to 5000, 500 to 2500 or 1000 to 2500 daltons. The polyether segment may be, for example, a polymer of one or more of ethylene oxide, 1,2-propylene oxide, 1,2-butylene oxide, 2,3-butylene oxide and tetrahydrofuran. Homopolymers of ethylene oxide and 1,2-propylene oxide are preferred polyether segments, as are copolymers of ethylene oxide and 1,2-propylene oxide. The polyether segment may be linear or branched.

The component b) monosilane compound can be made, for example, by reaction of a polyether having one terminal carbon-carbon double bond with a silane hydride having two or three hydrolysable substituents. The polyether may have one or more hydroxyl groups. A preferred polyether in this case is a linear polymer of ethylene oxide and/or 1,2-propylene oxide having one terminal hydroxyl group and one terminal carbon-carbon double bond. Such a preferred polyether may be formed by alkoxylating an unsaturated alcohol with ethylene oxide and/or 1,2-propylene oxide, as described above with regard to the Type 3) polysilane compounds. The reaction of the polyether with the silane hydride can be catalyzed with, for example, a platinum catalyst such as Karsted's catalyst.

Another way of making the component b) monosilane is to cap a polyether monol with a diisocyanate to form an isocyanate-terminated polyether, and then reacting the isocyanate group with an aminoalkylsilane that has 2 or 3 hydrolysable substituents. This produces a monosilane material that contains a urea group. The hydrolysable substituents preferably are alkoxyl.

Yet another way of making component b) monosilane is to cap a polyether monol with an isocyanatoalkyl silane that has 2 or 3 hydrolysable substituents. The hydrolysable substituents preferably are alkoxyl. Examples of such an isocyanatoalkylsilane are 3-(methyldimethoxysilyl)propylisocyanate, 3-(triethoxysilyl)propyl isocyanate and 3-(trimethoxylsilyl)propyl isocyanate.

The polyether monosilane can be manufactured separately from the component a) polysilane compound(s), and blended with the polysilane compound(s) to form a resin composition of the invention.

Alternatively, the polyether monosilane (component b)) and the polysilane compound(s) can be manufactured together to form a resin composition of the invention directly.

For example, a blend of a Type 1 polysilane compound as described above and a polyether monosilane can be prepared by reacting a silyl hydride having at least two hydrolysable substituents with a mixture of at least one polyether having two or more terminal carbon-carbon double bonds and at least one polyether having only one terminal carbon-carbon double bond.

Similarly, a blend of a Type 2) polysilane compound as described above and a polyether monosilane can be prepared, for example, in a reaction of an aminoalkylsilane, in which the silane group contains at least two hydrolysable substituents, with a mixture of at least one polyether that has two or more terminal isocyanate groups and at least one polyether that has only one terminal isocyanate group.

A blend of a Type 3) polysilane compound as described above and a polyether monosilane can be prepared, for example, can made in a process that starts with a polyether monol having terminal ethylenic unsaturation. The monol is hydrosilylated by reaction of the ethylenic group with a silyl hydride that has one or more hydrolysable substituents. The blend is formed in one step by reacting the resulting hydrosilylated polyether monol with mixture of at least one polyisocyanate (preferably a diisocyanate) and at least one monoisocyanate, or in two steps by capping the alcohol group of the hydrosilylated polyether monol with a polyisocyanate (again preferably a diisocyanate) and then coupling the resulting isocyanate-capped monosilylated polyether with a mixture of a monol and at least one polyol.

The polyether monosilane compound(s) constitute 20 to 95 mole-% of the total number of moles of components a) and b). They preferably constitute no more than 90% and more preferably no more than 80 mole-%, of the total number of moles of components a) and b). The polyether monosilane compound(s) may constitute at least 25 mole-%, at least 35 mole-% or at least 50 mole-% of the total number of moles of components a) and b).

In specific embodiments, the blend of components a) and b) has a number average of at least 1.12 hydrolysable silane groups per molecule. The blend of components a) and b) may have a number average of at least 1.35, or at least 1.4, hydrolysable silane groups per molecule, and may have a number average, for example, of up to 2, up to 1.8 or up to 1.65 hydrolysable silane groups per molecule. A silane group that has two or more hydrolysable substituents is considered as a single hydrolysable silane group for purposes of determining the average number of hydrolysable silane groups per molecule.

In some specific embodiments, the blend of components a) and b) contains 5 to 50 mole-%, preferably 5 to 35 mole-%, of one or more component a) materials that has at least three hydrolysable silane groups per molecule.

In terms of weight, the polyether monosilane compound(s) may constitute, for example, 1 to 60 percent of the combined weights of components a) and b) of the resin composition. The polyether monosilane in some embodiments constitutes at least 5 percent, at least 10 percent, at least 20 percent, or at least 33 percent of the combined weight of components a) and b), and in some embodiments constitutes up to 55 percent, up to 50 percent, up to 40 percent, up to 30 percent or up to 25 percent thereof.

In some embodiments, the blend of components a) and b) has an average functionality of at least 2.24 hydrolysable substituents per molecule. The blend of components a) and b) may have an average functionality of at least 2.7, or at least 2.8, hydrolysable substituents per molecule, and may have an average functionality, for example, of up to 6, up to 5.4, up to 4.95, up to 4, up to 2.7 or up to 1.85 hydrolysable substituents per molecule. The average number of hydrolysable substituents per hydrolysable silane group is preferably 2 to 3.

A moisture-curable sealant composition according to the invention includes at least one silanol condensation catalyst, i.e., one that catalyzes a curing reaction between the hydrolysable silane groups and water to form Si—O—Si linkages. Examples of useful catalysts include:

titanate compounds such as tetramethoxy titanate, tetraethoxy titanate, tetraisopropoxy titanate, dialkoxy titanium bis(acetoacetates) in which the alkoxy groups are independently methoxyl, ethoxyl and isopropoxyl, dialkoxy titanium bis(ethylacetoacetonates) in which the alkoxy groups are independently methoxyl, ethoxyl or isopropoxyl, and other dialkoxy titanium bis alkylacetoacetonates in which the alkoxy groups are independently methoxyl, ethoxyl or isopropoxyl;

tin compounds such as dibutyltin dilaurate, dibutyltin maleate, dibutyltin diacetate, tin octoate, tin naphthenate, dialkyltin diacetylacetonates like dibutyltin bis(acetylactonate), dibutyltin oxide;

aluminum compounds such as aluminum trisacetylacetonate and aluminum trisethylacetonate;

other metal carboxylates and/or chelates such as bismuth tris(2-ethylhexanoate) and zirconium tetraacetoacetonate; and amines such as butyl amine, octylamine, dibutylamine, monoethanolamine, diethanolamine, triethanolamine, diethylenetriamine, cyclohexylamine, benzylamine.

The silanol catalyst is present in a catalytically effective amount. The polysilylated polyether composition may contain, for example, 0.1 to 5, preferably 0.25 to 2 and more preferably 0.5 to 1.5 parts by weight of the catalyst per 100 parts by weight of components a) and b) of the sealant composition.

A moisture-curable resin composition, or sealant composition containing the moisture-curable resin composition, of the invention may contain various other ingredients, in addition to the polysilane compound(s), monosilane compound(s) and catalyst(s) described above.

One such other ingredient is an adhesion promoter. Examples of useful types of adhesion promoters are aminosilane and epoxysilane compounds. An aminosilane compound is one having at least one silicon atom bonded to one or more hydrolysable substituents (such as alkoxyl or phenoxyl groups), and at least one amino group bonded to the silicon atom through a non-hydrolysable substituent. An epoxysilane compound is one having at least one silicon atom bonded to one or more hydrolysable substituents (such as alkoxyl or phenoxyl groups), and at least one epoxy group bonded to the silicon atom through a non-hydrolysable substituent. Examples of aminosilane adhesion promoters includes 3-aminopropyletriethoxysilane, 3-aminopropyltrimethoxysilane, 4-aminobutyltriethoxysilane, m-aminophenyltrimethoxysilane, p-aminophenyltrimethoxysilane, 3-aminopropyl tris (methoxyethoxyethoxy)silane, 11-aminoundecyltriethoxysilane, 2-(4-pyridylethyl)triethoxysilane, and 3-(m-aminophenoxy)propyltrimethoxysilane. Examples of epoxy silane adhesion promoters include, beta-(3,4-epoxycyclohexyl)ethyltrimethyoxysilane and gamma-glycidoxypropyletrimethoxysilane, which are sold respectively as Silquest™ A-186 and Silquest™ A-187 by Momentive Performance Materials, Inc. One or more adhesion promoters may constitute, for example, 0.25 to 2%, especially 0.5 to 1%, of the total weight of the moisture-curable resin composition or sealant composition, as the case may be.

The moisture-curable resin composition or sealant composition may contain one or more particulate fillers. When present, the amount of particulate fillers may be at least 10, at least 15% or at least 25%, of the total weight of the moisture-curable resin composition or sealant composition, as the case may be, and may be as much as 75% or as much as 50% thereof by weight.

The particulate filler may be, for example, glass, sand, clay, calcium carbonate, mica, metal particles, silicon dioxide, talc, titanium dioxide, wollastonite, fly ash, various forms of carbon or other inorganic material. Any of such fillers may be surface-modified with, for example, a coupling agent such as a vinyl silane or an epoxy silane or other surface treatment. The filler preferably is in the form of particles that have a largest dimension of 50 nm to 100 μm. The particles may have an aspect ratio (ratio of longest to shortest dimension) of, for example, 1 to 10, 1 to 5 or 1.2. Some fillers may perform specialized functions in the moisture-curable polysilylated polyether composition. For example, titanium dioxide and other mineral fillers may function as colorants or brighteners.

The moisture-curable resin composition may contain one or more solvents having a boiling temperature of up to 100° C. if desired to, for example, adjust its viscosity and/or other rheological properties to a desired specification. The composition may contain one or more of a colorant; a preservative; a biocide; an antioxidant; a light-stabilizer; a moisture scavenger; and/or one or more other polymers.

The moisture-curable resin composition may contain one or more fugitive plasticizers, in addition to the monosilane compound described before. By "fugitive", it is meant such a plasticizer does not engage in the curing reaction and therefore does not become chemically bonded to the cured polymer. Such a plasticizer has a boiling temperature of at least 100° C., preferably at least 200° C., a flash point of at least 150° C., and a vapor pressure of no greater than $1 \times 10^{-2}$ mm Hg (1.33 Pa). It is preferred, however, that the resin composition contains little or none of such plasticizers. Accordingly, a preferred resin composition of the invention contains no more than 10 weight percent, no more than 5 weight percent, or no more than 1 weight percent of fugitive plasticizers, i.e., non-reactive compounds that have a boiling temperature of at least 100° C., a flash point of at least 150° C., and a vapor pressure of no greater than $1 \times 10^{-2}$ mm Hg (1.33 Pa). It may be devoid of such compounds.

The moisture-curable sealant composition of the invention can be prepared by well-known mixing and compounding methods, under conditions, preferably including the exclusion of water, under which the composition and its components do not moisture-cure.

A moisture-curable sealant composition of the invention is applied at a joint or crack in a substrate or at the junction between two or more substrates where sealing is desired. It is often convenient to package the composition into a tube, cartridge or other container, and to apply the adhesive from the container using a caulking gun or similar apparatus. It is generally desirable that the formulated sealant composition has a viscosity of 5 to 1000 Pa·s, so it resists running off under force of gravity or washing off until it has cured. In specific embodiment, the viscosity is up to 500 or up to 300 Pa·s. The substrate may be any material to which the cured composition forms an adhesive bond.

Curing is performed by exposing the sealant composition to water, which can be present in liquid form and/or as water vapor. The water may be supplied in the form as atmospheric moisture. The curing reaction proceeds spontaneously at room temperature in most cases; however, elevated temperatures may be used to speed the cure if desired.

The following examples are provided to illustrate the invention, but are not intended to limit the scope thereof. All parts and percentages are by weight unless otherwise indicated. In the following Examples:

Polysilylated Polyether A has approximately three terminal hydrolysable silyl groups per molecule and a number average molecular weight of 11,400. Each terminal hydrolysable silyl group is difunctional. It is free of urea groups. Polysilylated Polyether A is made by silylating an 800 molecular weight polyether monol having a terminal allylic group with $HSiCH_3(OCH_3)_2$ in the presence of a platinum catalyst, then capping the resulting monosilylated polyether monol with toluene diisocyanate, followed by coupling the capped material by reaction with a polyether polyol nominally having 3 hydroxyl groups per molecule and a hydroxyl equivalent weight of about 2040.

Polysilylated Polyether B is made in the same way as Polysilylated Polyether A, except the toluene diisocyanate is replaced with an equal molar quantity of isophorone diisocyanate. Polysilylated Polyether B has about 3 hydrolysable silane groups per molecule and a number average molecular weight of about 9000. Each terminal hydrolysable silyl group is difunctional.

Polysilylated Polyether C has approximately two terminal hydrolysable silane groups per molecule and a number average molecular weight of 10,000. It is made in the same way as Polysilylated Polyether A, except the polyether polyol used in the final coupling reaction is a diol having a hydroxyl equivalent weight of about 4000. Each terminal hydrolysable silyl group is difunctional.

The Polyether Monosilane has one terminal, difunctional hydrolysable silane group per molecule. It is made by silylating an 800 molecular weight polyether monol having a terminal allylic group with $HSiCH_3(OCH_3)_2$ in the presence of a platinum catalyst. The Polyether Monosilane has a molecular weight of about 906.

EXAMPLES 1-3 AND COMPARATIVE SAMPLE A

Comparative Sample A is prepared by mixing 0.5 parts of dibutyltindi(acetylacetone) into 100 parts of Polysilylated Polyether B using a high-speed mixer.

Polysilylated Polyether B and the Polyether Monosilane are mixed at an 80/20 weight ratio. A portion of the mixture is taken for viscosity measurement. Example 1 is prepared by adding 0.5 weight-percent dibutyltindi(acetoacetone) to another portion of the mixture. Example 2 is prepared by adding 1.0 weight-percent dibutyltindi(acetoacetone) to still another portion of the mixture.

Polysilylated Polyether B and the Polyether Monosilane are mixed at an 60/40 weight ratio. A portion of the mixture is taken for viscosity measurement. Example 3 is prepared by adding 0.5 weight-percent dibutyltindi(acetoacetone) to another portion of the mixture.

The room temperature viscosity of each of Examples 1-3 and Comparative Sample A is measured by a rheometer with cone and plate geometry in oscillation mode at a constant shear rate of 1 $sec^{-1}$.

In each case, curing time is measured by casting a ~2.95 mil (75 μm) film on a glass substrate from about 1 mL of the material. The film is cured at room temperature under ambient humidity for one week. Tack-free time of the film is measured according to ASTM D-5895 using a BYK drying time recorder. 0.05+/−0.005 g of catalyst is mixed with 9.95 g of the resin components on a speed-mixer. A 75 mil (1.9 mm) film is then formed on a glass substrate using ~1 mL of the sample. Tack-free time of the thin film is recorded with BYK drying time recorder set at 0-12 hrs.

Mechanical properties are measured according to ASTM D-1708 on thin films of the cured material. Films are prepared by casting a 25 mil (635 μm) film onto a polypropylene substrate and curing at room temperature and ambient humidity for one week. Dogbone samples for analysis are cut from the cured films.

Results of the testing of Examples 1-3 and Comparative Sample A are as indicated in Table 1.

TABLE 1

| Designation | Comp. Sample A* | Ex. 1 | Ex. 2 | Ex. 3 |
| --- | --- | --- | --- | --- |
| Polyether Monosilane, wt-% | 0 | 20 | 20 | 40 |
| Polyether Monosilane, mole-% | 0 | 76.2 | 76.2 | 86.8 |
| Polysilylated Polyether B, mole-% | 100 | 23.8 | 23.8 | 13.2 |
| Average # of Hydrolysable Silyl Groups per molecule[1] | 3 | 1.6 | 1.6 | 1.3 |
| Average Resin Functionality[2] | 6 | 3.2 | 3.2 | 2.6 |
| Amount of Catalyst, % | 0.5% | 0.5% | 1% | 0.5% |
| Viscosity, Pa · s | 10.4 | 5.9 | 5.9 | 2.2 |
| Curing Time | 2.75 hr | 4.8 hr | 2.5 hr | >12 hours |

TABLE 1-continued

| Designation | Comp. Sample A* | Ex. 1 | Ex. 2 | Ex. 3 |
|---|---|---|---|---|
| Tensile Strength, psi (kPa) | 143.2 (987) | 67.4 (465) | 81.3 (561) | 40.8 (281) |
| Elongation at Break, % | 206 | 212 | 234 | 486 |
| Tensile stress at 100% elongation, psi (kPa) | 78.9 (544) | 37.0 (255) | 42.0 (290) | 8.8 (61) |

*Not an example of the invention.
[1]Average number of hydrolysable silane groups per molecule in the mixture of the Polyether Monosilane and Polysilylated Polyether.
[2]Average number of hydrolysable substituents per molecule in the mixture of Polyether Monosilane and Polysilylated Polyether.

The Polyether Monosilane is an effective plasticizer, as evidenced by the reduction in viscosity of Examples 1-3 compared to Comparative Sample A, and the increased elongation and reduced tensile strength of the cured adhesive. The presence of the Polyether Monosilane tends to slow the rate of cure; however, this is easily compensated for by increasing the catalyst level slightly, as seen by comparing the curing times of Example 2 with Example 1 and Comparative Sample A.

EXAMPLES 4-7 AND COMPARATIVE SAMPLES B AND C

Examples 4-7 and Comparative Samples B and C are made from the following general formulation:

| Ingredient | Parts by Weight |
|---|---|
| Polysilylated Polyether A | 20 |
| Calcium Carbonate | 55 |
| Plasticizer | Type and amount varies |
| Titanium Dioxide | 2.4 |
| UV absorber | 0.4 |
| Vinyl silane moisture scavenger | 0.8 |
| Amino silane adhesion promoter | 0.7 |
| Dibutyltin diacetylacetonate | Varies |

The plasticizer type and amount, and the amount of catalyst, are as indicated in Table 2.

In each case, all ingredients except catalyst are mixed, and viscosity is measured. Then, the indicated amount of catalyst is added and curing time and mechanical properties measured as described before.

TABLE 2

| Designation | Ex. 4 | Ex. 5 | Comp. Samp. B* | Comp. Samp. C* | Ex. 6 | Ex. 7 |
|---|---|---|---|---|---|---|
| Plasticizer Type | PEM[1] | PEM | DINP[2] | DINP | PEM | PEM |
| Plasticizer Amount, wt.-% | 20.45 | 20.45 | 20.45 | 20.45 | 10.22 | 10.22 |
| Amount of Catalyst, wt-% | 0.25 | 0.75 | 0.20 | 0.60 | 0.20 | 0.60 |
| Polyether Monosilane, mole-% | 93 | 93 | 0 | 0 | 86.5 | 86.5 |
| Polysilylated Polyether A, mole-% | 7 | 7 | 100 | 100 | 13.5 | 13.5 |
| Average # of Hydrolysable Silyl Groups per molecule[3] | 1.14 | 1.14 | 3 | 3 | 1.27 | 1.27 |
| Approx. Resin Functionality[4] | 2.28 | 2.28 | 6 | 6 | 2.54 | 2.54 |
| Viscosity, cps | 92 | ND | 37 | ND | 213 | ND |
| Curing Time | >11 hr | 8-10 hr | 7.5 hr | 2.5 hr | 10 hr | 4 hr |
| Tensile Strength, psi (kPa) | 52.8 (368) | 40.7 (284) | 133 (929) | 153 (1069) | 126 (880) | 130 (908) |
| Elongation at Break, % | 727 | 670 | 301 | 358 | 440 | 466 |
| Tensile stress at 100% elongation, psi (kPa) | 11.7 (82) | 8.3 (58) | 94.7 (661) | 89.6 (626) | 93.1 (650) | 82.8 (578) |

*Not an example of the invention.
[1]PEM—Polyether Monosilane.
[2]DINP-diisononylphthalate.
[3]Average number of hydrolysable silane groups per molecule in the mixture of the Polyether Monosilane and Polysilylated Polyether.
[4]Average number of hydrolysable substituents per molecule in the mixture of Polyether Monosilane and Polysilylated Polyether.

As shown by the data in Table 2, the Polyether Monosilane is a highly effective plasticizer. When present at the 20% level, its use leads to a large reduction in tensile strength and a large increase in elongation, compared to when an equal amount of diisononyl phthalate is used (as in Comparative Samples B and C). The reduction in tensile strength and increase in elongation are evidence of plasticization. Examples 6 and 7, when compared with Comparative Samples B and C, demonstrate that 10% of the polyether monosilane plasticizes very similarly to 20% of diisononylphthalate. As with Examples 1-3, a small increase in catalyst level is needed to obtain curing times equivalent to those of the Comparative Samples.

EXAMPLE 8 AND COMPARATIVE SAMPLE D

A mixture of polysilylated polyethers and a polyether silane is prepared as follows:

An 800 molecular weight polyether monol having a terminal allylic group is silylated with $HSiCH_3(OCH_3)_2$ in the presence of a platinum catalyst. The resulting monosilylated polyether monol is capped by reaction with toluene diisocyanate. The isocyanate-capped material thus obtained is reacted with a mixture of a monol, a diol and a triol formed by alkoxylating a mixture of 55.7 mole-% of a monol initiator, 36.6 mole-% of a diol initiator and 7.7 mole-% of a triol initiator to a hydroxyl equivalent weight of 1533.

The resulting mixture contains about 37 weight percent (55.7 mole-%) of polyether monosilanes and 63 weight percent of polysilylated polyethers. The mixture contains 7.7 mole-% of polysilylated polyethers that contain 3 hydrolysable silane groups. The average number of hydrolysable silane groups per molecule is about 1.5.

The viscosity of the mixture is measured as described in Example 1. The mixture is separated into portions. Into one portion (Example 8A), 0.5 weight-% of dibutyl tin diacetylacetonate catalyst is mixed in. 1 weight-% of the catalyst is mixed into the other portion to make Example 8B. Each sample is cured and curing time and tensile properties are measured as described in Example 1. Results are as indicated in Table 3. For comparison, typical values achieved by curing a mixture of 0.5 weight-% of the catalyst in Polysilylated Polyether C are indicated.

TABLE 3

| Designation | Ex. 8A | Ex. 8B | Comp. Sample D |
|---|---|---|---|
| Polyether monosilane, mole-% | 55.7 | 55.7 | 0 |
| Polyether monosilane, wt-% | 37 | 37 | 0 |
| Trisilylated polyethers, wt-% | 8 | 8 | 0 |
| Trisilylated polyethers, mole-% | 7.7 | 7.7 | 0 |
| Average # of Hydrolysable Silyl Groups per molecule[1] | 1.52 | 1.52 | 2 |
| Average resin functionality[2] | 3.04 | 3.04 | 4 |
| Viscosity (Pa · s) | 3.0 | 3.0 | 15-25 |
| Curing Time, hr | 6.5 | 3.5 | 3-5 |
| Tensile Strength, psi (kPa) | 53 (370) | 56 (391) | 50-85 (350-600) |
| Elongation, % | 276 | 286 | 275-450 |
| Tens. stress @100% elongation, psi (kPa) | 22.5 (157) | 21.0 (147) | 20-30 (140-210) |

[1] Average number of hydrolysable silane groups per molecule in the mixture of the Polyether Monosilane and Polysilylated Polyether.
[2] Average number of hydrolysable substituents per molecule in the mixture of Polyether Monosilane and Polysilylated Polyether.

As the data in Table 3 shows, the resin mixture of the invention has a large viscosity advantage over Polysilylated Polyether C and cures to give very comparable properties.

Two other portions of the resin mixture are combined with a particulate calcium carbonate. In each case, 1% by weight of dibutyltin diacetylacetonate is added based on the combined weight of resin mixture and calcium carbonate, to form formulated sealant Example 8C and 8D. Portions of each of Examples 8C and 8D are cured as in previous examples, and tensile properties are measured as before. Results are as indicated in Table 4.

TABLE 4

| Designation | Ex. 8C | Ex. 8D |
|---|---|---|
| % Filler | 55 | 70 |
| Tensile str., psi (kPa) | 166 (1160) | 164 (1146) |
| Elongation, % | 517 | 428 |
| Tens. Stress % 100% elongation, psi (kPa) | 66 (461) | 93 (650) |

EXAMPLE 9

A mixture of polysilylated polyethers and a polyether monosilane is prepared as follows:

An 800 molecular weight polyether monol having a terminal allylic group is silylated with $HSiCH_3(OCH_3)_2$ in the presence of a platinum catalyst. The resulting monosilylated polyether monol is capped by reaction with toluene diisocyanate. The isocyanate-capped material thus obtained is reacted with a mixture of a monol, a diol and a triol formed by alkoxylating a mixture of 72.3 mole-% of a monol initiator, 13.2 mole-% of a diol initiator and 14.4 mole-% of a triol initiator to a hydroxyl equivalent weight of 1533.

The resulting mixture contains about 34 weight percent (72.3 mole-%) of polyether monosilanes and 66 weight percent of polysilylated polyethers. The mixture contains about 13.5 mole-% of polysilylated polyethers that contain 3 hydrolysable silane groups. The average number of hydrolysable silane groups per molecule is about 1.3 and the average functionality is about 2.6.

What is claimed is:
1. A moisture-curable resin composition comprising
   a) at least one liquid silane-terminated polyether having a number average molecular weight of at least 8000 and at least two hydrolysable silane groups per molecule; and
   b) 50 to 90 mole percent, based on the total number of moles of components a) and b), of at least one liquid polyether monosilane compound having a polyether segment having a number average molecular weight of 500 to 2500 daltons and exactly one di- or trifunctional hydrolysable silane group per molecule; and c) at least one silanol catalyst,
wherein the blend of components a) and b) contains 5 to 35 mole-% of one or more component a) materials that have at least three hydrolysable silane groups per molecule, the average functionality of components a) and b) is 2.24 to 4 hydrolysable substituents per molecule.

2. The moisture-curable resin composition of claim 1, wherein the blend of components a) and b) has an average of at least 1.12 hydrolysable silane groups per molecule.

3. The moisture-curable resin composition of claim 1, wherein the blend of components a) and b) has an average of 1.35 to 2 hydrolysable silane groups per molecule.

4. The moisture-curable resin composition of claim 1, which contains 20 to 50 percent of component b), based on the combined weights of components a) and b).

5. The moisture-curable resin composition of claim 1 wherein the hydrolysable silane group of the liquid polyether monosilane is a difunctional hydrolysable silane group.

6. The moisture-curable resin composition of claim 5, wherein the hydrolysable silane group of the liquid polyether monosilane is a dialkoxysilane group.

7. The moisture-curable resin composition of claim 1 wherein the liquid polyether monosilane has at least one hydroxyl group.

8. The moisture-curable resin composition of claim 1, wherein the liquid polyether monosilane compound formed in a reaction of a polyether having one terminal carbon-carbon double bond with a silane hydride having two or three hydrolysable substituents.

9. The moisture-curable resin composition of claim 1, wherein the silane-terminated polyether is a urethane group-containing polysilylated polyether that is free of urea groups.

10. The moisture-curable resin composition of claim 9, wherein the urethane-group-containing polysilylated polyether is made in a process wherein a polyether monol having terminal ethylenic unsaturation is hydrosilylated by reaction of the ethylenic unsaturation with a silyl hydride that has one or more hydrolysable substituents, and the resulting hydrosilylated polyether monol is coupled in one step by reaction with a polyisocyanate or in two steps by capping the alcohol group with a polyisocyanate and then coupling the resulting isocyanate-capped monosilylated polyether with a polyol.

11. The moisture-curable resin composition of claim 1 wherein component a) includes one or more compounds represented by the structure (I):

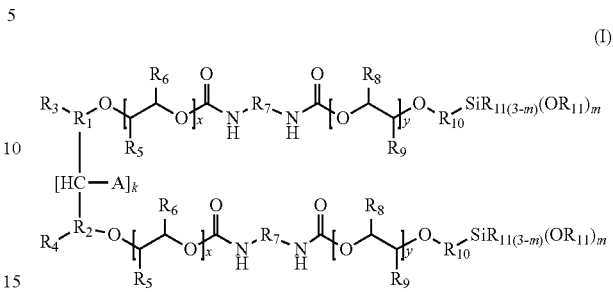

where A is either H or has the structure (II):

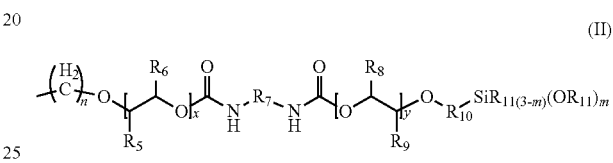

k is a number from 0 to 4, m and n are independently numbers from 0 to 3, the values of x and y are numbers such that the compound has a molecular weight of 4000 to 20,000, $R_1$, $R_2$, $R_{10}$ and $R_{11}$ are independently straight chain or branched alkyl groups having 1 to 4 carbon atoms, $R_3$, $R_4$, $R_5$, $R_6$, $R_8$ and $R_9$ are independently hydrogen or straight chain or branched alkyl groups having 1 to 4 carbon atoms, and $R_7$ is aliphatic, cycloaliphatic, bis-benzylic and/or aromatic and has 2 to 20 carbon atoms.

12. The moisture-curable resin composition of claim 1, which further comprises at least one mineral filler and at least one adhesion promoter.

13. The moisture-curable resin composition of claim 1, which contains no more than 1 weight percent of a fugitive plasticizer.

14. A moisture-curable sealant composition comprising the moisture-curable resin composition of claim 1 and at least one silanol catalyst.

* * * * *